July 23, 1929. O. L. MILLS 1,721,966
PROCESS FOR MAKING TUNGSTEN ALLOYS
Filed Jan. 11, 1929
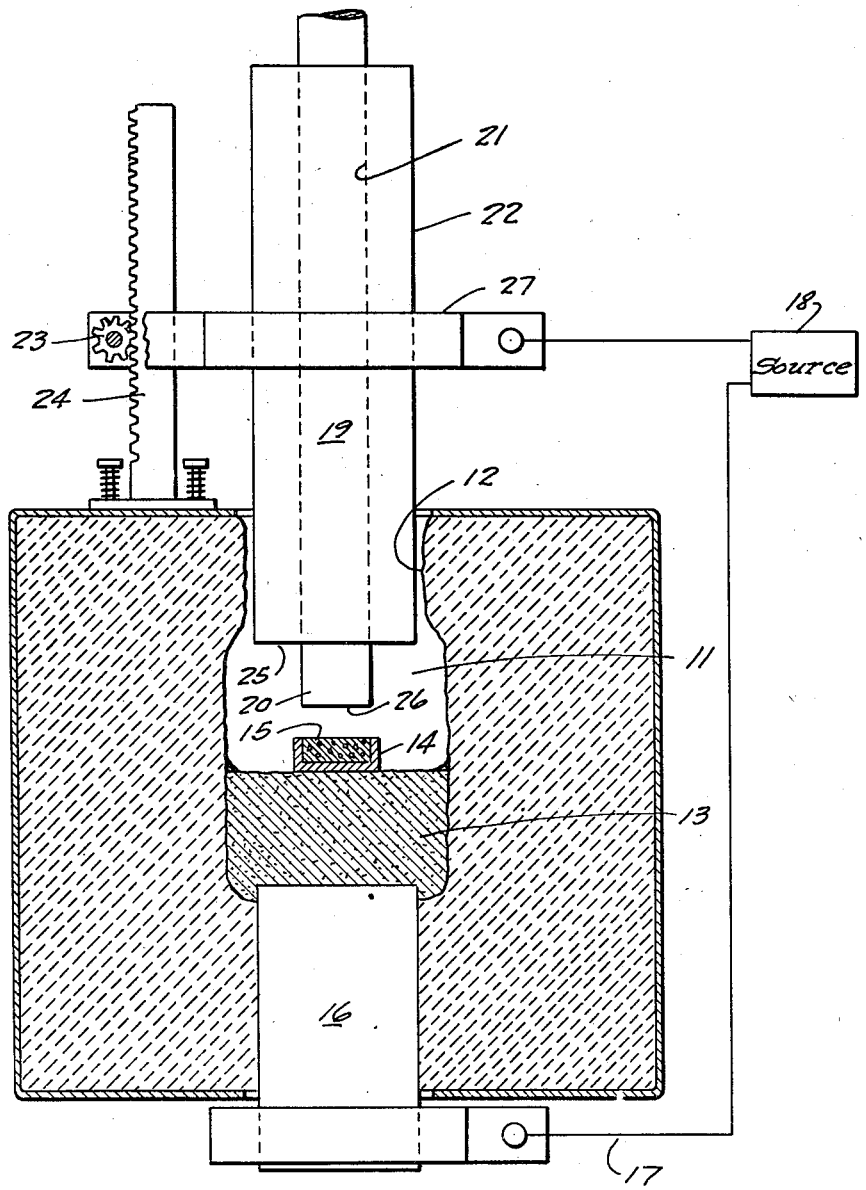
INVENTOR
Oscar L. Mills
BY John Flam
ATTORNEY Patented July 23, 1929.

1,721,966

UNITED STATES PATENT OFFICE.

OSCAR L. MILLS, OF LOS ANGELES, CALIFORNIA.

PROCESS FOR MAKING TUNGSTEN ALLOYS.

Application filed January 11, 1929. Serial No. 331,747.

This invention relates to tungsten alloys, and particulary to a process and apparatus for making tungsten carbide.

The chemical compound known as tungsten carbide is useful for many purposes. This utility is due to its extreme degree of hardness. Small pieces of it have been and are being used extensively as inlays in the cutting edges of tools, such as oil well drill bits. Such tungsten carbide has been made by chemical union of carbon and tungsten. In prior processes for making this material, there is constant danger of incorporating excess carbon in the alloy, which can produce free graphite in the final product. The graphite reduces the hardness of the carbide and also is conducive to the formation of pores.

It is one of the objects of my invention to improve the quality of the carbide, by ensuring against excessive carburization.

It is another object of my invention to facilitate the manufacture of the carbide by the aid of improved apparatus, whereby the cost is materially reduced. In this connection, I arrange the process in such a way that all waste of the tungsten is utilized, as by recovering scrap pieces of the carbide, and by concentrating the carbide from the walls of the containers in which the carbide is formed.

Broadly considered, the process contemplates the melting of tungsten in the presence of carbon to form the carbide, which in the final form, is one of the constituents of a mechanical mixture incorporating metallic tungsten and the carbide, the exact proportions of tungsten carbide and the tungsten not being critical. Since tungsten melts at about 5700° F., it is apparent that special measures must be taken to attain this temperature. It is accordingly still another object of my invention to make it possible to melt the tungsten effectively, and especially by the aid of an electric arc.

My invention possesses many other advantages, and has other objects which may be made more easily apparent from a consideration of one embodiment of my invention. For this purpose I have shown a form in the drawings accompanying and forming part of the present specification. I shall now proceed to describe this form in detail, which illustrates the general principles of my invention; but it is to be understood that this detailed description is not to be taken in a limiting sense, since the scope of my invention is best defined by the appended claims.

Referring to the drawing:

The single figure is a diagrammatic representation of an apparatus that is used in my improved process.

In my process, I use a furnace such as shown in the figure, having a chamber 11 formed with refractory walls, and an opening 12 at the top to permit the entry of the electrode structure to be hereinafter described. A floor 13 is formed of carbon powder or particles. On the floor 13 can be placed a container 14 that holds the material 15 to be fluxed by the arc. This container is a conductor and is highly refractory; carbon is the best material I am now aware of for this purpose. This container can also serve to supply the necessary carbon to the mix 15.

An electric arc circuit is completed between container 14, a conductor or electrode 16 in the floor 13, wire 17 to a source of current 18; and from this source to an electrode structure 19. The connection to structure 19 is accomplished by the water cooled electrode holder 27, that makes contact with the large electrode which as explained hereinafter, acts as the roof of the furnace. In this way, the resistance in the circuit is kept at a minimum value. The arc is formed between this electrode structure and the material 15, which is melted thereby and which forms the carbide alloy. The electrode structure 19 includes an electrode proper 20, which is preferably made from carbon, and which thus serves as an additional source of carbon for the chemical compound formed in the furnace. This electrode 20 is accommodated in an axial bore 21 through a refractory conducting member 22, that can be vertically adjusted as by pinion 23 and rack 24. The electrode 20 projects below the member 22. The annular surface 25 formed by member 22 around the electrode 20 serves as a refractory roof for the heat rays developed by the arc between parts 15 and 20, and also to reflect these rays downwardly to material 15. It is to be noted that the electrode 20 has about the same diameter as the inside diameter of container 14. Thus it is possible to confine the heat in the container 14.

The vertical distance between the annular surface 25, and the bottom surface of electrode 20 is kept substantially constant and at an optimum value. As electrode 20 wears away or is disintegrated, it is urged downwardly in any appropriate manner to maintain this distance. I have found that the member 22 is best made from carbon also, as carbon seems to withstand the extremely high temperatures better than ordinary refractory linings or bricks, which at the temperatures attained, would be quickly disintegrated in the furnace. Thus annular space 25 can indeed be said to form a refractory or temperature resistant roof for the arc chamber. This ensures practical operation of the device; and even if member 22 becomes worn, it can be lowered to the proper position by the mechanism shown. Of course, arc chamber 11 is kept as small as possible, so that electrode member 22 serves to cover the major portion of the chamber.

The composition of material 15 to form the carbide can vary within wide limits. Tungsten in the form of fine powder can be used, mixed with a small percentage of powdered tungsten oxide; say from 3 to 20% by weight. This oxide forms an important part of the mixture. It serves to free oxygen when heated, which combines with the excess carbon to form carbon oxides. Thus it acts to retard against overcarburization, and also oxidizes any free carbon that may, if permitted to remain, form graphite particles. Preferably, also, in order to provide a proper conducting bridge, the tungsten can be partly in the form of coarse grains or pieces which contact with each other to form conducting paths.

When the mixture is melted by the action of the arc, which is capable of producing temperatures of between 6000° and 7000° F., it is rapidly poured into comparatively cool molds, so as to form thin castings or ingots or bars. The relatively cool mold chills the carbide and causes a maximum of carbon to be retained in solution as tungsten carbide. Since the molten material solidifies rapidly in the open air, care must be taken to pour it rapidly from container 14 into the molds before this occurs.

As stated before, the carbon is supplied to the mix from the electrodes and also from the carbon containers 14, the arc in fact subsisting in an atmosphere of carbon oxide and metallic gases.

Although it is possible to utilize fresh tungsten as just described for the process, yet if that be done, serious loss of carbide in the form of scrap and unreclaimed material would result. Thus for example, tiny pieces of the finished carbide, too small to be commercially utilized, would ordinarily be wasted. Also, carbide adheres to the inner walls of receptacle 14. In order to reclaim this, the receptacles 14 can be ground or pulverized in a mill, and then the carbide particles can be recovered on a concentrating table in a well known manner.

When using such reclaimed material, the tungsten scrap and concentrate can be substituted for almost all of the tungsten in material 15; say from 50 to 80% by weight of the whole mix can be scrap and concentrate. The relative amounts of scrap and concentrate are immaterial; they can for example be used in equal proportions. The concentrate of course is in the form of a fine powder; and the scrap in the form of coarse particles that can serve in the mixture to form conducting bridges for the electric current. The tungsten can be added as powder. The tungsten oxide can be conveniently formed by oxidizing some of the concentrate. This can be accomplished by roasting, which results in forming an oxide coating over each particle of the tungsten carbide concentrate. In this way, a very uniform distribution of the oxide is secured.

The commercial ingredients then can be tabulated as follows:

Reclaimed tungsten carbide, 50 to 80%.
Tungsten, 15 to 20%.
Tungsten oxide, 3 to 20%.

The preferred formula is
Tungsten carbide scrap, 30%.
Reclaimed tungsten concentrate, 30%.
Tungsten, 20%.
Tungsten oxide, 20%.

The use of scrap and the concentrate is highly important for effective commercial operation. It is apparent that the percentages used depend upon the available supply of such scrap. The ultimate product is probably a mixture of metallic tungsten and tungsten carbide. The castings made from the molten material can be in the form of thin plates, of from $\frac{1}{16}$ inch or greater in thickness, which can later be broken into small pieces available for use in the manner outlined hereinbefore.

In the following claims, I use the term "tungsten bearing material" to denote tungsten carbide, or a mixture of the carbide and tungsten, or metallic tungsten.

I claim:

1. A continuous process which comprises mixing a tungsten compound said compound including tungsten oxide in the proportion of from 3 to 20% by weight of the oxide, and metallic tungsten in the proportion of from 15 to 20% by weight of the metallic tungsten and reclaimed tungsten carbide alloy, fusing said mixture by a carbon electric arc, reclaiming waste material from the product in the form of tungsten carbide, oxidizing at least a portion of the reclaimed waste material, to form tungsten oxide and incorporating said oxide in a succeeding mixture.

2. A continuous process for producing tungsten carbide which comprises mixing a tungsten compound, said compound including tungsten oxide, and a tungsten carbide alloy, fusing said mixture by a carbon electric arc, reclaiming waste material from the product, in the form of tungsten carbide, oxidizing at least a portion of the reclaimed waste material, to form tungsten oxide, and incorporating said oxide in a succeeding mixture.

In testimony whereof I have hereunto set my hand.

OSCAR L. MILLS.